United States Patent
Gnali

(10) Patent No.: US 11,884,111 B2
(45) Date of Patent: Jan. 30, 2024

(54) TIRE INSERT AND VEHICLE WHEEL COMPRISING SAID TIRE INSERT

(71) Applicant: Oscar Ettore Gnali, Lumezzane (IT)

(72) Inventor: Oscar Ettore Gnali, Lumezzane (IT)

(73) Assignee: Oscar Ettore Gnali, Lumezzane (IT)

( * ) Notice: Subject to any disclaimer, the term of this patent is extended or adjusted under 35 U.S.C. 154(b) by 0 days.

(21) Appl. No.: 17/948,865

(22) Filed: Sep. 20, 2022

(65) Prior Publication Data

US 2023/0103017 A1   Mar. 30, 2023

(30) Foreign Application Priority Data

Sep. 24, 2021  (IT) .................. 102021000024558

(51) Int. Cl.
*B60C 5/02* (2006.01)
*B60C 17/06* (2006.01)

(52) U.S. Cl.
CPC .................. *B60C 17/065* (2013.01)

(58) Field of Classification Search
CPC .... B60C 5/10; B60C 5/04; B60C 5/20; B60C 5/02; B60C 17/06
See application file for complete search history.

(56) References Cited

U.S. PATENT DOCUMENTS 3,485,283 A   12/1969   Thorwill et al.

FOREIGN PATENT DOCUMENTS

| DE | 1216138 B | * | 5/1996 | ............ B60C 17/06 |
|---|---|---|---|---|
| FR | 2639880 A | * | 6/1990 | ............ B60C 17/06 |
| GB | 1134428 A | | 11/1968 | |
| GB | 2008505 A | | 6/1979 | |
| GB | 2013143 A | * | 8/1979 | ............ B60B 21/12 |
| GB | 2013143 A | | 8/1979 | |
| GB | 2238513 A | | 6/1991 | |

OTHER PUBLICATIONS

Search Report for IT 102021000024558 dated Apr. 19, 2022, Munich, DE.
Tanja et al., Was sind EVA-Reifen ??? , Urbia Community Forum Kleinkind, May 24, 2011, pp. 1-1, Urbia Community, retrieved from the Internet on Apr. 1, 2022: URL:https://www.urbia.de/forum/3-kleinkind/3158225-was-sind-eva-reifen.

\* cited by examiner

*Primary Examiner* — Cedrick S Williams
(74) *Attorney, Agent, or Firm* — Ferguson Case Orr Paterson

(57) ABSTRACT

A tire insert for vehicle wheel which has an annular element made in one piece of polymer material is provided. The annular element has a base portion suitable for being accommodated in a rim seat of a rim and an enlarged portion having a section larger than the base portion. The enlarged portion is shaped to have shape and size to always be spaced apart from an inner tire side when the tire is inflated to a predetermined standard working pressure. When the tire is deflated, the enlarged portion comes into contact with the tire to support the tire while the vehicle wheel is running. A vehicle wheel having a tire, a rim onto which the tire is mounted, and the tire insert is also provided.

10 Claims, 2 Drawing Sheets

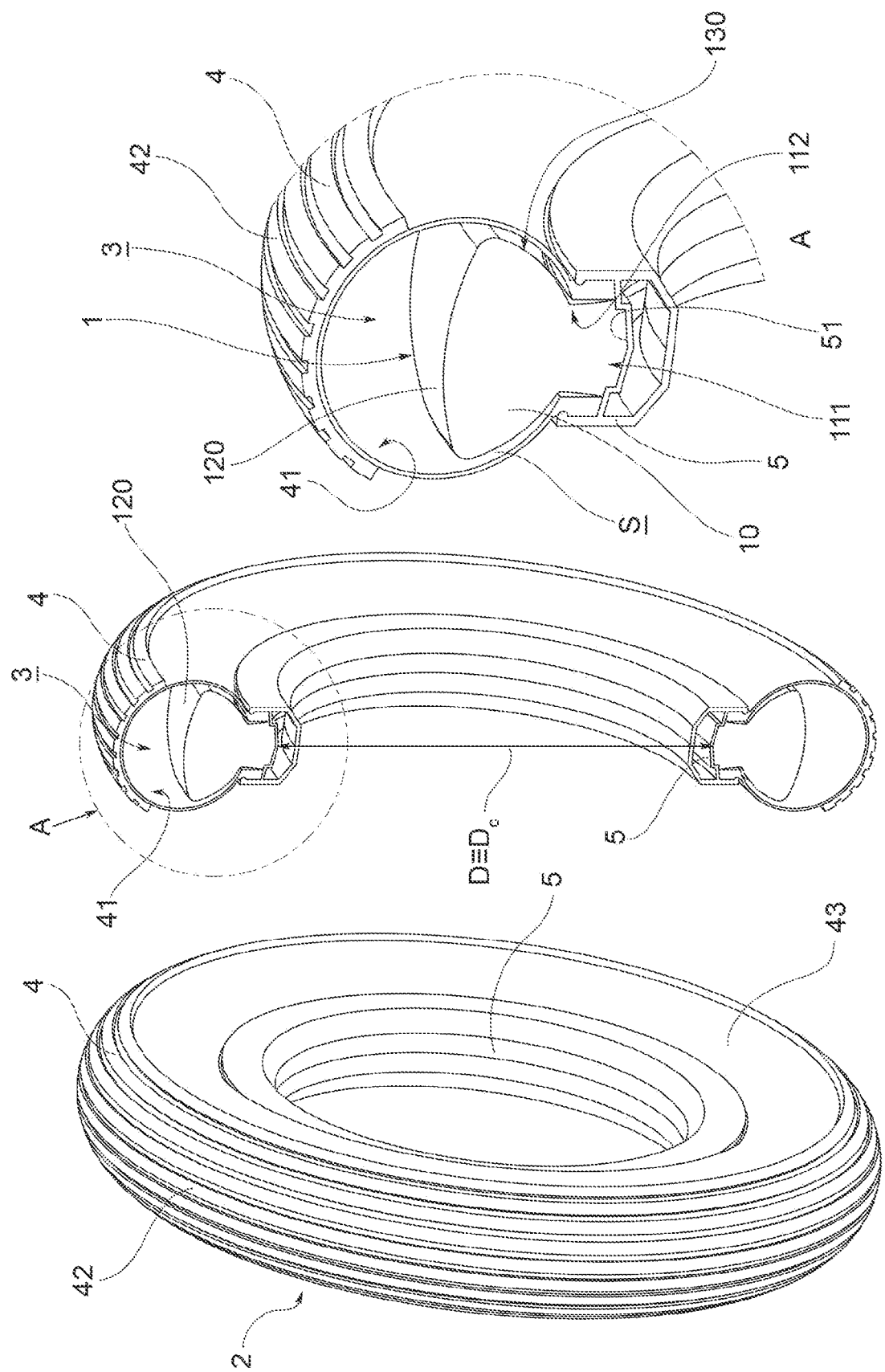

TIRE INSERT AND VEHICLE WHEEL COMPRISING SAID TIRE INSERT

CROSS-REFERENCE TO RELATED APPLICATION

This application claims priority to Italian Patent Application No. 102021000024558 filed on Sep. 24, 2021, the contents of which are incorporated by reference in their entirety.

FIELD OF THE INVENTION

The present invention relates to a tire insert and a vehicle wheel comprising said tire insert.

In general, the present invention relates to the field of tire inserts for vehicle wheels, particularly, but not exclusively, for off-road vehicles, such as dirt bikes and motorcycles, enduro bikes, and the like.

BACKGROUND OF THE INVENTION

At least in the field of the aforesaid off-road vehicles, the possibility is known to insert polymer foam inserts inside the tires to limit puncture phenomena and to improve the dynamic performance of the tire during the stresses received from the terrain during the ride. According to the prior art, said insert type comprises annular-shaped inserts shaped to adhere and push at least partially on the inner walls of the tire to impart the appropriate dynamic performance during operation.

Typically, such inserts are toroidal in shape with a solid circular cross-section.

Inconveniently, the very fact that said type of insert is in contact with the inner wall of the tire affects tire performance in a manner dependent on both tire inflation pressures and working position of the wheel relative to the road, not guaranteeing homogeneity of performance as a consequence.

Furthermore, said type of insert is not suitable for use also on normal road vehicles. Indeed, the type of inserts in the prior art completely fills the tire with the function of completely replacing air and thus simulating pressures that ensure tire support. The wear of such inserts is early and is caused by heat created between the ground and the tire and also by internal rubbing occurring between the insert, the rim, and the tire.

Therefore, the type of inserts of the prior art is not reliable over time to support the tire in the event of a puncture and also compromises the ideal dynamic performance of the tire during normal operation. Indeed, since this type of insert is in contact with the tire, it biases the dynamics of the tire and the wheel as a whole, thus not allowing for adequate standardization of performance and compliance with the necessary type-approvals for road vehicles.

SUMMARY OF THE INVENTION

It is the object of the present invention to overcome the aforesaid drawbacks of the prior art and to provide a tire insert which is capable of being reliable even under various conditions, temperatures, and stresses of use, while at the same time minimally affecting the dynamics of the entire tire-rim assembly when the insert itself is not required to work.

It is a further object of the present invention to allow, in the event of a puncture, to travel stretches of road at reduced speed, necessary for securing the vehicle or repairing the tire, without losing control of the vehicle itself and without damaging the rim of the vehicle/motorcycle.

Said purposes are achieved by a tire insert and a vehicle wheel as described and claimed herein.

Preferred or advantageous embodiments of the present invention are also described.

BRIEF DESCRIPTION OF THE FIGURES

The features and advantages of the tire insert and the vehicle wheel will be apparent from the following description which illustrates some preferred embodiments, given by way of indicative, non-limiting examples, with reference to the accompanying figures, in which:

FIG. 1 shows an axonometric view of a vehicle wheel according to the present invention;

FIG. 2 shows an axonometric view of a cross-section of the wheel in FIG. 1, according to an embodiment of the present invention, in which a tire insert according to an embodiment of the present invention housed inside the wheel tire is also visible;

FIG. 3 shows an enlarged detail of FIG. 2; and

DETAILED DESCRIPTION

Figure 4:
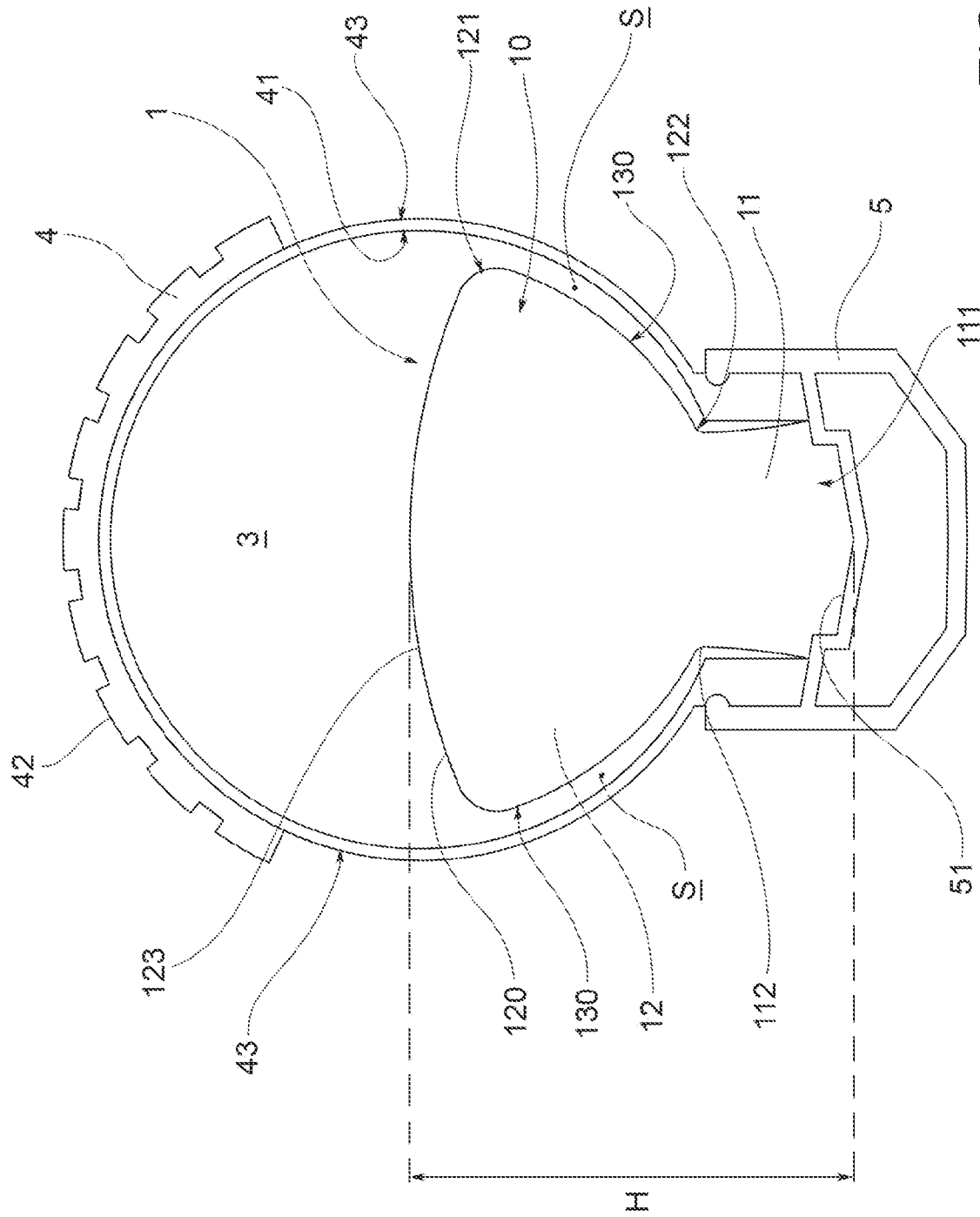
FIG. 4 shows a front plan view of a section of a vehicle wheel according to an embodiment of the present invention, inside of which a tire insert is inserted according to an embodiment of the present invention.

With reference to the figures, a tire insert for a vehicle wheel 2 suitable for being inserted in an inner annular cavity 3 resulting between the tire 4 and a rim 5 of the vehicle wheel 2 is indicated by reference numeral 1 as a whole. The tire insert is also known in the industry by the term "foam or mousse".

The tire insert 1 comprises an annular element 10 made in one piece of polymeric material.

Preferably, the polymeric material is any material selected from the group comprising polyurethane, polystyrene, rubber, foam-rubber, open-cell or closed-cell foam, and solid-skin foam.

More preferably, the polymeric material is an expanded polymeric material.

The tire insert 1 is suitable for making at least partial contact with the rim 5 of the vehicle wheel 2. Furthermore, the annular element 10 comprises a base portion 11, suitable for being accommodated in a rim seat 51 of the rim 5, and an enlarged portion 12, having a section larger than the base portion 11. The enlarged portion 12 comprises an outer enlarged portion surface 120 of convex shape suitable for facing towards an inner tire side 41. Preferably, the tire insert 1 has an entirely solid cross-section.

The enlarged portion 12 is shaped to have such shape and size that the enlarged portion 12 is always spaced apart from the inner tire side 41 when the tire is inflated to a predetermined standard working pressure. Furthermore, the shape and size of the enlarged portion 12 are such that, on the other hand, when the tire is deflated or when the tire is inflated to a pressure much lower than the predetermined working pressure, the enlarged portion 12 comes into contact with the tire to support the tire while the vehicle wheel is running. This feature effectively allows the tire to be supported when it is punctured or there is a sharp pressure drop, and at the same time allows not to interfere with the performance of the tire when the tire is properly inflated because the tire insert 1 is not in contact with the tire and applies no pressure on it.

According to an embodiment, the enlarged portion 12 is shaped so that there is a space S between the outer enlarged portion surface 120 and the inner tire side 41, having a decreasing course starting from the insert portion 121 farthest from the rim 5 to the insert portion 122 closest to the rim 5 when the tire is inflated to a predetermined standard working pressure. In other words, the volume of the space S interposed between the enlarged portion 12 and the inner tire side 41 decreases as a portion of the volume of the space S is considered closer to the rim 5.

For example, in an embodiment, such feature is achieved by a shape of the enlarged portion 12 comprising convex-shaped insert sidewalls 130 arranged facing the inner tire side 41 at the tire sidewalls 43 of the tire. In particular, the insert sidewalls 130 are shaped as a portion of a parabola or hyperbola.

According to an advantageous embodiment, the enlarged portion 12 has a bowl-shaped section, with a convex top edge 123 having convexity facing the inner tire side 41. In this variant, the top edge 123 joins the insert sidewalls 130, forming a totally convex enlarged portion section.

According to an embodiment, the base portion 11 is neck-shaped and comprises a lower base 111 suitable for resting against the rim 5 and an upper base 112 which is joined to the enlarged portion 12 and tapered with respect to the lower base 111 i.e., has a smaller section.

According to a preferred embodiment, advantageous in the case of two-wheeled vehicles such as bicycles, the total radial height H of the tire insert 1 is between 20 cm and 50 cm.

Preferably, the tire insert 1 is made entirely of an expanded polymeric material.

According to an embodiment, the tire insert 1 is made entirely of ethylene vinyl acetate (EVA). Preferably, the ethylene vinyl acetate has a density comprised between 0.08 and 0.12 g/cm$^3$, a breaking load comprised between 10 and 14 kg/cm$^2$, an elongation at break comprised between 200 and 300%, a tearing degree comprised between 1.5 and 2.5 kg/cm, a compression degree comprised between 50% and 70%, and a hardness either comprised between or equal to 16-21 Shore A, with the latter tending to change as the ambient temperature changes.

As appreciable from the accompanying figures, it is apparent that the present invention also addresses a vehicle wheel 2 comprising a tire 4, a rim 5 on which tire 4 is mounted, and a tire insert 1 as described herein. The tire 4 is to be understood as a typical tire having a tread 42 and an inner tire side 41 facing away from the tread 42. The tire insert 1 is mounted in an inner annular cavity 3 resulting between the inner tire side 41 and the rim 5. The annular element 10 is positioned so that the base portion 11 is in contact with the rim 5 in the rim seat 51. As described hereinabove, the enlarged portion 12 is shaped to have shape and size to be entirely spaced apart from the inner tire side 41 when the tire 4 is inflated to a predetermined standard working pressure. Furthermore, when the tire is deflated or when the tire is inflated to a pressure much lower than the predetermined working pressure, the enlarged portion 12 is in contact with the tire 4 to support the tire during movement of the wheel and to prevent the tire sidewalls 43 from wearing out.

As apparent from the accompanying figures, the tire insert 1 occupies less volume than the total volume of the inner annular cavity 3 resulting between the tire 4 and the rim 5.

In particular, the tire insert 1 is shaped and sized so that it does not entirely occupy the volume of the inner annular cavity 3.

Preferably, the tire insert 1 occupies a volume at most 80% of the total volume of the inner annular cavity 3 resulting between the tire 4 and the rim 5. More preferably, the tire insert 1 occupies a volume of at most 60% of the total volume of the inner annular cavity 3, even more preferably a volume of at most 50% of the total volume of the inner annular cavity 3.

As mentioned, advantageously between the outer enlarged portion surface 120 and the inner tire side 41 there is a space S, having a decreasing course starting from the insert portion 121 farthest from the rim 5 to the insert portion 122 closest to the rim 5 when the tire is inflated to a predetermined standard working pressure. This makes it possible to appropriately calibrate the gradual intervention of the insert on the tire as the tire inclination changes and as the internal pressure changes.

According to an embodiment, the base portion 11 is neck-shaped and comprises a lower base 111 resting against the rim 5 and an upper base 112 that is joined to the enlarged portion 12. In this variant, also the base portion 11 preferably remains always distanced from the tire inner tire side 41 when the tire is inflated to a predetermined tire standard working pressure.

According to an embodiment, the inner diameter D of the tire insert 1, when the tire insert is not mounted onto the rim 5, has a shorter length than the inner rim diameter Dc, such that when the tire insert is mounted onto the rim 5 the tire insert applies a radial pressure to the rim seat 51 to stabilize the adhesion to the rim 5.

Innovatively, the present invention brilliantly overcomes the mentioned drawbacks with regard to the tire inserts of the prior art.

The special shape and size of the enlarged portion, with convex sidewalls and top edge, reduce sidewall bulk and, most importantly, apply no pressure onto the sidewalls of the tire.

In this manner, the tire, free from sidewall contact, can work at its best. The vehicle ride is smoother and more precise when cornering while being unbiased by the presence of the tire insert, returning to the dynamic design performance of the wheel, under most driving conditions.

At the same time, advantageously, the tire insert and vehicle wheel according to the present invention are reliable over time to support the tire in the event of a puncture, because there is no fretting wear phenomenon between the tire insert and tire.

Therefore, the present invention is extremely reliable and usable on most road vehicles, even if certain tire performance type-approvals are required.

It is apparent that the present invention is preferentially intended for tubeless wheels.

To meet specific requirements, a person skilled in the art may make variants or replace elements with other, functionally equivalent ones to the embodiments of the present invention.

Such variants are also included in the scope of protection as described and claimed herein.

What is claimed is:

1. A tire insert for a vehicle wheel suitable for being inserted into an inner annular cavity resulting between a tire and a rim of the vehicle wheel, the tire insert comprising an annular element made in one piece of polymer material and suitable for coming at least partially into contact with the rim of the vehicle wheel, the annular element comprising a base portion suitable for being accommodated in a rim seat of the rim and an enlarged portion having a larger section than the base portion,
- wherein the enlarged portion comprises an outer enlarged portion surface of convex shape suitable for facing towards an inner tire side,
- wherein the enlarged portion is shaped to have such shape and size that said enlarged portion always remains spaced apart from the inner tire side when the tire is inflated to a predetermined standard working pressure and such that, when the tire is deflated or when the tire is inflated to a pressure much lower than the predetermined standard working pressure, the enlarged portion comes into contact with the tire to support the tire during movement of the wheel,
- wherein the tire insert is entirely made of ethylene vinyl acetate (EVA) having a density comprised between 0.08 and 0.12 g/cm$^3$, a breaking load comprised between 10 and 14 kg/cm$^2$, an elongation at break comprised between 200% and 300%, a tearing degree comprised between 1.5 and 2.5 kg/cm, a compression degree comprised between 50% and 70%, and a hardness either comprised between or equal to 16-21 Shore A, the hardness tending to change as ambient temperature changes.

2. The tire insert of claim 1, wherein the enlarged portion is shaped to have such shape and size that said enlarged portion always remains spaced apart from the inner tire side so that there is a space between the outer enlarged portion surface and the inner tire side, and so that said space has a decreasing course from an insert portion farthest from the rim to an insert portion closest to the rim when the tire is inflated to a predetermined standard working pressure.

3. The tire insert of claim 1, wherein the enlarged portion has a bowl-shaped section, with a convex top edge having convexity facing an inner side of the tire.

4. The tire insert of claim 1, wherein the base portion is neck-shaped and comprises a lower base suitable for resting against the rim and an upper base that is joined to the enlarged portion and is tapered with respect to the lower base, the upper base having a smaller section.

5. The tire insert of claim 1, wherein a total radial height of the tire insert is between 20 cm and 50 cm.

6. The tire insert of claim 1, wherein the tire insert is entirely made of an expanded polymeric material.

7. A vehicle wheel comprising:
- a tire and a rim onto which the tire is mounted, the tire comprising an inner tire side facing an opposite side of a tread of the tire;
- a tire insert mounted in an inner annular cavity resulting between the tire and the rim of the vehicle wheel, the tire insert comprising
- an annular element made in one piece of polymer material and suitable for coming at least partially into contact with the rim of the vehicle wheel, the annular element comprising a base portion suitable for being accommodated in a rim seat of the rim and an enlarged portion having a larger section than the base portion,
- wherein the enlarged portion comprises an outer enlarged portion surface of convex shape suitable for facing towards an inner tire side,
- wherein the enlarged portion is shaped to have such shape and size that said enlarged portion always remains spaced apart from the inner tire side when the tire is inflated to a predetermined standard working pressure and such that, when the tire is deflated or when the tire is inflated to a pressure much lower than the predetermined standard working pressure, the enlarged portion comes into contact with the tire to support the tire during movement of the wheel,
- wherein the tire insert is entirely made of ethylene vinyl acetate (EVA) having a density comprised between 0.08 and 0.12 g/cm$^3$, a breaking load comprised between 10 and 14 kg/cm$^2$, an elongation at break comprised between 200% and 300%, a tearing degree comprised between 1.5 and 2.5 kg/cm, a compression degree comprised between 50% and 70%, and a hardness either comprised between or equal to 16-21 Shore A, the hardness tending to change as ambient temperature changes;
- wherein the tire insert is mounted in the inner annular cavity resulting between the inner tire side and the rim, wherein the annular element is positioned so that the base portion is in contact with the rim in the rim seat, and
- wherein the tire insert is shaped and sized so as not to entirely occupy a volume of the inner annular cavity;
- the enlarged portion being shaped to have such shape and size that said enlarged portion is spaced apart from the inner tire side when the tire is inflated to the predetermined standard working pressure, and when the tire is deflated or when the tire is inflated to a pressure much lower than the predetermined working pressure, the enlarged portion is in contact with the tire to support the tire during movement of the vehicle wheel and to prevent tire sidewalls from wearing out.

8. The vehicle wheel of claim 7, wherein between the outer enlarged portion surface and the inner tire side there is a space having a decreasing course from an insert portion farthest from the rim to an insert portion closest to the rim when the tire is inflated to the predetermined standard working pressure.

9. The vehicle wheel of claim 7, wherein the base portion is neck-shaped and comprises a lower base suitable for resting against the rim and an upper base that is joined to the enlarged portion, and wherein also the base portion always remains spaced apart from the inner tire side when the tire is inflated to the predetermined standard working pressure.

10. The vehicle wheel of claim 7, wherein an inner diameter of the tire insert, when the tire insert is not mounted to the rim, has a shorter length than an inner rim diameter, such that when the tire insert is mounted to the rim the tire insert applies a radial pressure to the rim seat to stabilize adhesion to the rim.

* * * * *